(12) United States Patent
Chuang et al.

(10) Patent No.: US 11,501,531 B2
(45) Date of Patent: Nov. 15, 2022

(54) SYSTEMS AND METHODS FOR ANTI-SPOOFING PROTECTION USING MOTION DETECTION AND VIDEO BACKGROUND ANALYSIS

(71) Applicant: CyberLink Corp., Taipei (TW)

(72) Inventors: Fu-Kai Chuang, Taipei (TW); Sheng-Hung Liu, Taipei (TW)

(73) Assignee: CYBERLINK CORP., Taipei (TW)

( * ) Notice: Subject to any disclaimer, the term of this patent is extended or adjusted under 35 U.S.C. 154(b) by 0 days.

(21) Appl. No.: 17/189,454

(22) Filed: Mar. 2, 2021

(65) Prior Publication Data

US 2021/0279472 A1    Sep. 9, 2021

Related U.S. Application Data

(60) Provisional application No. 62/984,475, filed on Mar. 3, 2020.

(51) Int. Cl.
*G06K 9/00* (2022.01)
*G06V 20/40* (2022.01)
(Continued)

(52) U.S. Cl.
CPC .............. *G06V 20/41* (2022.01); *G06T 7/215* (2017.01); *G06V 40/166* (2022.01); *G06T 2207/10016* (2013.01)

(58) Field of Classification Search
CPC ...... G06V 20/41; G06V 40/166; G06V 40/40; G06V 40/16; G06T 7/215; G06T 2207/10016
See application file for complete search history.

(56) References Cited

U.S. PATENT DOCUMENTS 8,515,124 B2    8/2013  Yoo et al.
8,542,879 B1    9/2013  Nechyba et al.
(Continued)

FOREIGN PATENT DOCUMENTS

CN    108537131 A    9/2018
CN    106295522 B    9/2019
(Continued)

OTHER PUBLICATIONS

Kim, Y., et al.; "A Motion and Similarity-Based Fake Detection Method for Biometric Face Recognition Systems;" 2011 IEEE International Conference on Consumer Electronics (ICCE); Jan. 2011; https://ieeexplore.ieee.org/document/5722522.
(Continued)

*Primary Examiner* — Dhaval V Patel
(74) *Attorney, Agent, or Firm* — McClure, Qualey & Rodack, LLP

(57) ABSTRACT

A computing device captures a live video of a user. For a first frame of the live video, the computing device obtains first target positional coordinates of a first target point located a first predetermined distance from the computing device and obtains first background data. For a second frame, the computing device obtains second target positional coordinates of a second target point located a second predetermined distance from the computing device and obtains second background data. The computing device calculates a target motion vector based on the first target point and the second target point and calculates a background motion vector based on feature points in the first background data and the second background data. The computing device determines a difference value between the target motion vector and the background motion vector and determines whether the user is spoofing the computing device based on the difference value.

17 Claims, 8 Drawing Sheets

(51) Int. Cl.
    *G06T 7/215*           (2017.01)
    *G06V 40/16*          (2022.01)

(56)                   References Cited

U.S. PATENT DOCUMENTS

| | | |
|---|---|---|
| 9,934,443 B2 | 4/2018 | Sezille et al. |
| 10,019,624 B2 | 7/2018 | Liu et al. |
| 10,885,362 B2 * | 1/2021 | Lin .................. G06F 21/32 |
| 11,170,252 B2 * | 11/2021 | Chen .................. G06V 10/25 |
| 2013/0188840 A1 * | 7/2013 | Ma .................. G06V 40/45 |
| | | 382/107 |
| 2017/0228586 A1 | 8/2017 | Morishita |
| 2018/0046852 A1 | 2/2018 | Ionita |
| 2018/0048645 A1 * | 2/2018 | Ionita .................. G06V 40/166 |
| 2018/0239955 A1 | 8/2018 | Rodriguez et al. |
| 2019/0026544 A1 | 1/2019 | Hua et al. |
| 2019/0080155 A1 | 3/2019 | Ganong et al. |
| 2020/0175260 A1 * | 6/2020 | Cheng .................. G06V 20/64 |
| 2021/0004588 A1 * | 1/2021 | Correa Bahnsen .. G06V 40/197 |
| 2021/0158509 A1 * | 5/2021 | Kwak .................. G06V 40/40 |

FOREIGN PATENT DOCUMENTS

| | | |
|---|---|---|
| WO | 2019/060023 A1 | 3/2019 |
| WO | 2019/122168 A1 | 6/2019 |

OTHER PUBLICATIONS

Bharadwaj, S., et al.; "Face Anti-spoofing via Motion Magnification and Multifeature Videolet Aggregation;" 2014; pp. 1-12.
Fokkema, J.; "Using a Challenge to Improve Face Spoofing Detection;" 2016; pp. 1-9.

* cited by examiner

SYSTEMS AND METHODS FOR ANTI-SPOOFING PROTECTION USING MOTION DETECTION AND VIDEO BACKGROUND ANALYSIS

CROSS-REFERENCE TO RELATED APPLICATION

This application claims priority to, and the benefit of, U.S. Provisional Patent Application entitled, "Method of Anti-Spoofing by Using Motion Detector and Video Background," having Ser. No. 62/984,475, filed on Mar. 3, 2020, which is incorporated by reference in its entirety.

TECHNICAL FIELD

The present disclosure generally relates to security measures in devices and more particularly, to systems and methods for anti-spoofing using motion detection and video background analysis.

BACKGROUND

Given the extensive use of smartphones and other computing devices in daily activities, such devices typically contain sensitive data and allow users to access mobile payment applications and other services. As such, there is an ongoing need for incorporating improved security measures to prevent unauthorized access to such devices.

SUMMARY

In accordance with one embodiment, a computing device captures a live video of a user. For a first frame of the live video, the computing device obtains first target positional coordinates of a first target point located a predetermined distance from the computing device and obtains first background data. For a second frame of the live video, the computing device obtains second target positional coordinates of a second target point located a predetermined distance from the computing device and obtains second background data. The computing device calculates a target motion vector based on the first target point and the second target point and calculates a background motion vector based on feature points in the first background data of the first frame and the second background data in the second frame. The computing device determines a difference value between the target motion vector and the background motion vector and determines whether the user is spoofing the computing device based on the difference value.

Another embodiment is a system that comprises a memory storing instructions and a processor coupled to the memory. The processor is configured by the instructions to capture a live video of a user. For a first frame of the live video, the processor is configured to obtain first target positional coordinates of a first target point located a predetermined distance from the system and obtain first background data. For a second frame of the live video, the processor is configured to obtain second target positional coordinates of a second target point located a predetermined distance from the system and obtain second background data. The processor is further configured to calculate a target motion vector based on the first target point and the second target point and calculate a background motion vector based on feature points in the first background data of the first frame and the second background data in the second frame. The processor is further configured to determine a difference value between the target motion vector and the background motion vector and determine whether the user is spoofing the system based on the difference value.

Another embodiment is a non-transitory computer-readable storage medium storing instructions to be implemented by a computing device having a processor, wherein the instructions, when executed by the processor, cause the computing device to capture a live video of a user. For a first frame of the live video, the processor is configured to obtain first target positional coordinates of a first target point located a predetermined distance from the computing device and obtain first background data. For a second frame of the live video, the processor is configured to obtain second target positional coordinates of a second target point located a predetermined distance from the computing device and obtain second background data. The processor is further configured to calculate a target motion vector based on the first target point and the second target point and calculate a background motion vector based on feature points in the first background data of the first frame and the second background data in the second frame. The processor is further configured to determine a difference value between the target motion vector and the background motion vector and determine whether the user is spoofing the computing device based on the difference value.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

A description of a system for implementing anti-spoofing protection during identity verification is described followed by a discussion of the operation of the components within the system. An improved anti-spoofing technique implemented in a computing device is disclosed for preventing unauthorized access of personal devices that allow users to unlock the devices using an image of the user's facial region. Some computing devices are vulnerable to spoofing attempts by unauthorized users using images or videos of the owners of the devices.

Figure 1:
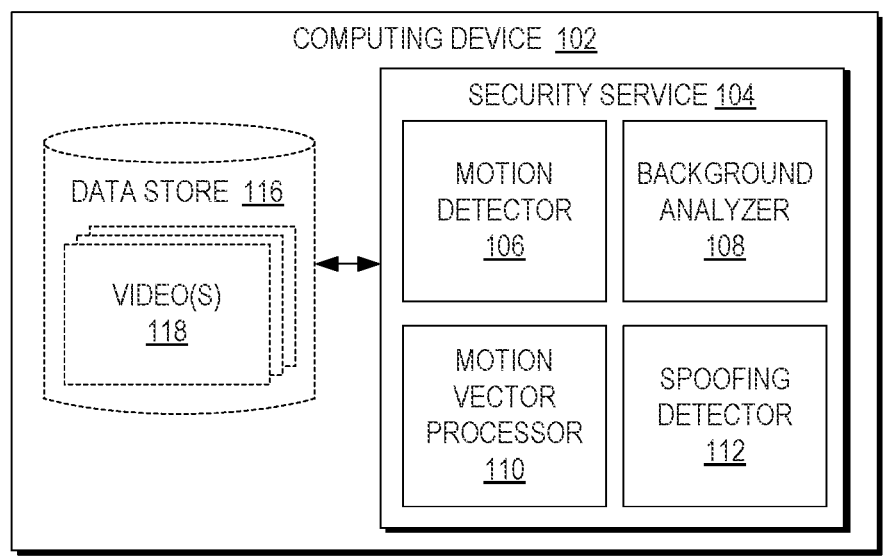
FIG. 1 is a block diagram of a computing device for implementing anti-spoofing protection during identity verification according to various embodiments of the present disclosure.

FIG. 1 is a block diagram of a computing device 102 in which the embodiments disclosed herein may be implemented. The computing device 102 may be embodied as a computing device such as, but not limited to, a smartphone, a tablet computing device, a laptop, and so on. A security service 104 executes on a processor of the computing device 102 and includes a motion detector 106, a background analyzer 108, a motion vector processor 110, and a spoofing detector 112.

The motion detector 106 is configured to obtain a live video 118 of the user using, for example, a front facing camera on the computing device 102 and store the video 118 in a data store 116. The video 118 stored in the data store 116 may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The computing device 102 is equipped with a gyroscope and an accelerator where positional information relating to the computing device 102 are obtained by the motion detector 106 based on measurements performed by the gyroscope and the accelerator. For a first frame of the captured video 118, the motion detector 106 obtains first target positional coordinates of a first target point located a predetermined distance from the computing device 102. If the computing device 102 is stationary, the positional coordinates of the computing device 102 are (0,0,0). During the same first frame of the video 118, the background analyzer 108 is configured to also obtain first background data. For a second frame of the capture video 118, the motion detector 106 similarly obtains second target positional coordinates of a second target point located a predetermined distance from the computing device 102. During the second frame of the video 118, the background analyzer 108 is configured to also obtain second background data.

The motion detector 106 calculates calculate a target motion vector (Vm) based on the first target point and the second target point. Note that if the computing device 102 remains completely still between the first and second frames, the target motion vector is equal to 0 (Vm=0). The motion detector 106 also calculates a background motion vector (Vd) based on feature points in the first background data of the first frame and the second background data in the second frame. The motion vector processor 110 is configured to determine a difference value between the target motion vector and the background motion vector. Based on the difference value, the spoofing detector 112 determines whether the user is spoofing the computing device 102.

Figure 2:
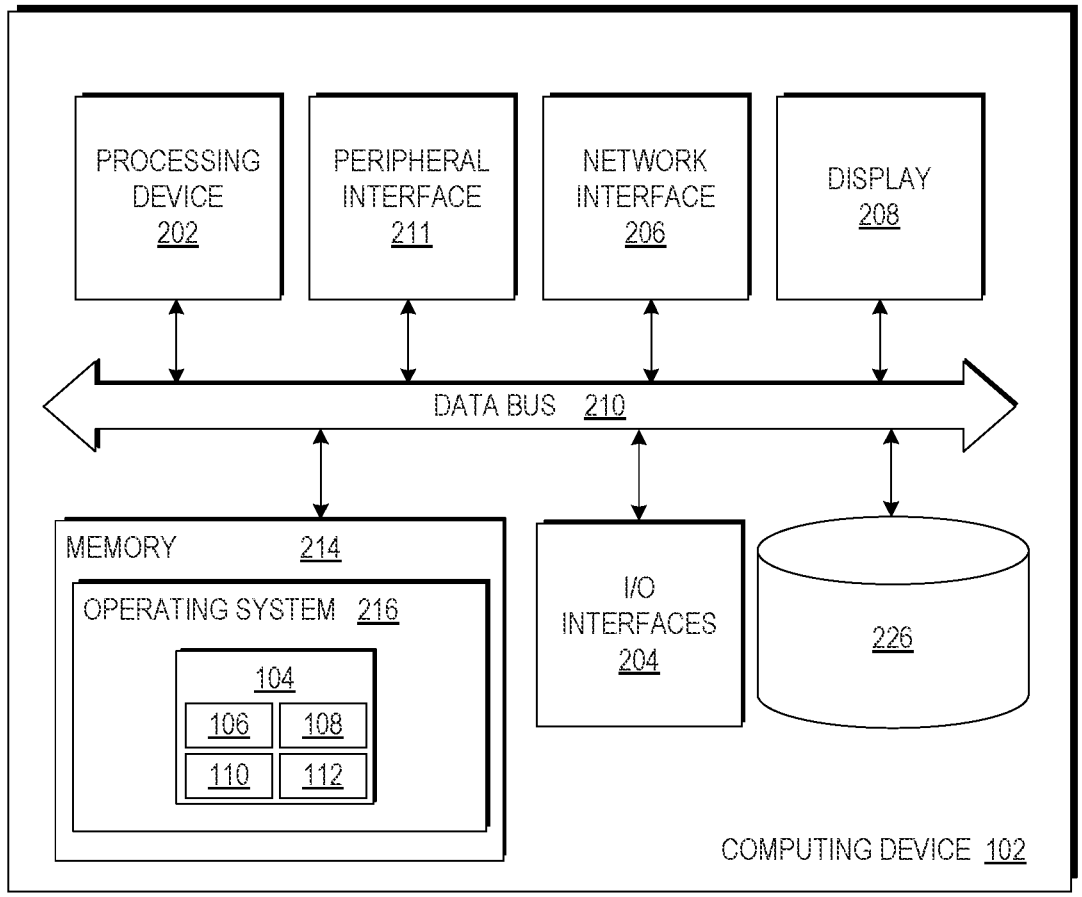
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
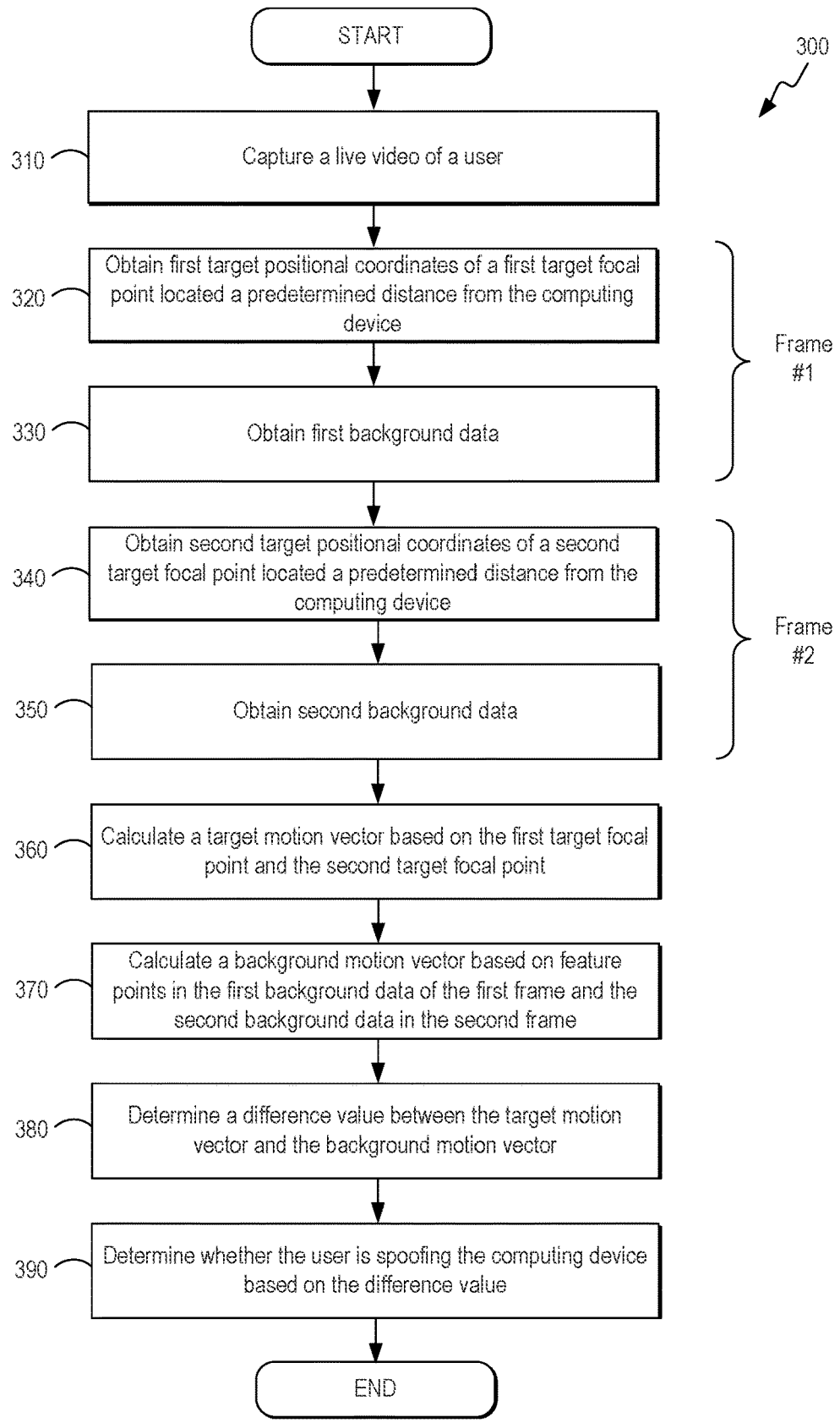
FIG. 3 is a top-level flowchart illustrating examples of functionality implemented as portions of the computing device of FIG. 1 for implementing anti-spoofing protection during identity verification according to various embodiments of the present disclosure.

Reference is made to FIG. 3, which is a flowchart 300 in accordance with various embodiments for implementing anti-spoofing protection during identity verification performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 captures a live video of a user to obtain a plurality of frames. At block 320, the computing device 102 obtains first target positional coordinates of a first target point located a predetermined distance from the computing device 102. At block 330, the computing device 102 obtains first background data. Block 320 and block 330 are performed during a first frame of the live video.

At block 340, the computing device 102 obtains second target positional coordinates of a second target point located a predetermined distance from the computing device 102. The predetermined distances in which the first target point and the second target point are located from the computing device 102 are real number multiples of a distance (x) such that the predetermined distance is equal to n*(x), wherein n>1, x is a focal distance, and wherein a value of (n) is set based on an average distance between an object in a background and the computing device 102.

The object in the background may be selected by the computing device 102 based on focus parameters relating to the camera of the computing device 102. The focus parameters of the camera are used to calculate the distance between the computing device 102 and the selected background object. Such focus parameters may include, for example, the camera sensor size and the focal length. For some embodiments, the focus parameters include the focal length of the catadioptric system (the combined focal lengths of the mirror and the camera) are used to calculate the distance between the computing device 102 and the selected background object. Note that the first frame and the second frame may comprise adjacent frames or non-adjacent frames. At block 350, the computing device 102 obtains second background data. For some embodiments, the computing device 102 obtains the first background data and the second background data by performing facial detection and filtering all individuals depicted in the first frame and the second frame. Block 340 and block 350 are performed during a second frame of the live video.

At block 360, the computing device 102 calculates a target motion vector based on the first target point and the second target point. For some embodiments, the computing device 102 calculates the target motion vector by obtaining first yaw data, first pitch data, and first roll data of the computing device 102, second yaw data, second pitch data, and second roll data of the computing device 102, first positional coordinates of the computing device 102, and second positional coordinates of the computing device 102.

The computing device 102 performs three-dimensional (3D) coordinate transformation on the first target point based on the first yaw data, the first pitch data, and the first roll data of the computing device 102, the second yaw data, the second pitch data, the second roll data, the first positional coordinates of the computing device 102, and the second positional coordinates of the computing device 102 to generate 3D coordinates of the first target point. The computing device 102 determines a difference value between the 3D coordinates of the first target point and 3D coordinates of the second target point to generate a 3D target motion vector. The computing device 102 then transforms the 3D target motion vector into a two-dimensional (2D) target motion vector.

For some embodiments, the first and second positional coordinates of the computing device 102, first and second yaw data, first and second pitch data, and first and second roll data of the computing device 102 are obtained based on acceleration measured by a gyroscope in the computing device 102 and displacement measured by an accelerometer in the computing device 102. The first target positional coordinates of the first target point located and the second target positional coordinates of the second target point located from the computing device 102 are calculated based on the first positional coordinates, the first yaw data, first pitch data, first roll data of the computing device 102, the second positional coordinates, the second yaw data, second pitch data, and second roll data of the computing device 102.

For some embodiments, the predetermined distances in which the first target point and the second target point are located from the computing device 102 comprise real number multiples of a distance (x) such that the predetermined distance is equal to n*(x), wherein n>1, x is a focal distance, and wherein a value of (n) is set based on an average distance between an object in a background and the computing device 102. For such embodiments, a determination is made that the user is spoofing the computing device 102 when the difference value is greater than a threshold value.

For some embodiments, the computing device 102 calculates the target motion vector by performing the following operations. For the first frame of the live video, the computing device 102 obtains the first target point in a first vertical plane equal to a predetermined distance n*(x) to obtain a focal point of a camera in a facial region of the user, the first target point is a real number multiple of a distance (x) such that the predetermined distance is equal to n*(x), wherein n=1 and x is a focal distance. The computing device 102 modifies the first target point based on a first camera focus to determine a first point in the first vertical plane outside the facial region of the user. For the second frame of the live video, the computing device 102 obtains the second target point in a second vertical plane equal to a predetermined distance n*(x) to obtain a focal point of the camera in the facial region of the user, wherein n=1 and x is a focal distance. The computing device 102 modifies the second target point in the second vertical plane based on a second camera focus to determine a second point in the second vertical plane outside the facial region of the user. The computing device 102 determines a difference value between the second target point and the first target point to generate the target motion vector. For such embodiments, a determination is made that the user is spoofing the computing device 102 when the difference value is less than a threshold value.

At block 370, the computing device 102 calculates a background motion vector based on feature points in the first background data of the first frame and the second background data in the second frame. For some embodiments, the computing device 102, calculates the background motion vector by selecting a plurality of feature points in the first background data and in the second background data meeting a threshold degree of similarity. The computing device 102 subtracts feature points in the second background data from corresponding feature points in the first background data to generate difference reference values and averages the reference values to generate the background motion vector.

At block 380, the computing device 102 determines a difference value between the target motion vector and the background motion vector. For some embodiments, the computing device 102 determines the difference value between the target motion vector and the background motion vector by determining the cosine similarity between the target motion vector and the background motion vector. The cosine similarity may be calculated as follows:

$$\text{similarity}(A, B) = \frac{A \cdot B}{\|A\| \times \|B\|} = \frac{\sum_{i=1}^{n} A_i \times B_i}{\sqrt{\sum_{i=1}^{n} A_i^2} \times \sqrt{\sum_{i=1}^{n} B_i^2}}$$

At block 390, the computing device 102 determines whether the user is spoofing the computing device 102 based on the difference value. When n=1, a determination is made that the user is spoofing the computing device when the difference value between the target motion vector (Vm) and the background motion vector (Vd) is less than a threshold value. On the other hand, when n>1, a determination is made that the user is spoofing the computing device when the difference value between the target motion vector (Vm) and the background motion vector (Vd) is greater than a threshold value.

Figure 4:
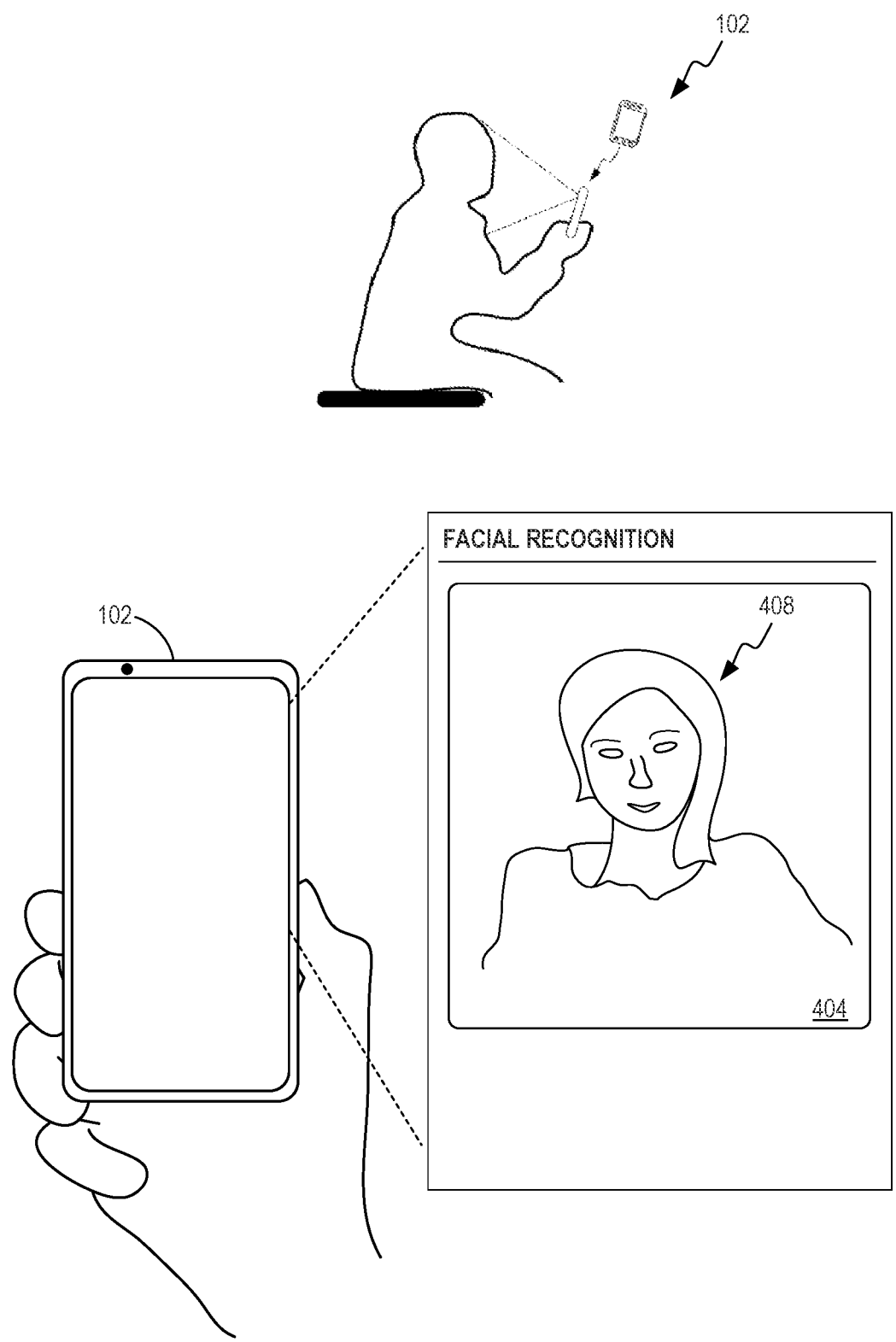
FIG. 4 illustrates a user attempting to gain access to the computing device of FIG. 1, where the computing device is embodied as a smartphone equipped with a front facing camera according to various embodiments of the present disclosure.

To further illustrate various aspects of the present invention, reference is made to the following figures. FIG. 4 illustrates a user attempting to gain access to a computing device 102 embodied as a smartphone equipped with a front facing camera. The front facing camera of the computing device 102 captures a live video of the user's facial region 408 for purposes of verifying the identity of the user attempting to gain access to the computing device 102. For some embodiments, the live video is displayed in a viewing window 404, and the computing device 102 compares the facial region 408 depicted in the live video to a reference facial region stored in the data store 116 (FIG. 1). If a match is identified, the user is granted access to the computing device 102.

Figure 5:
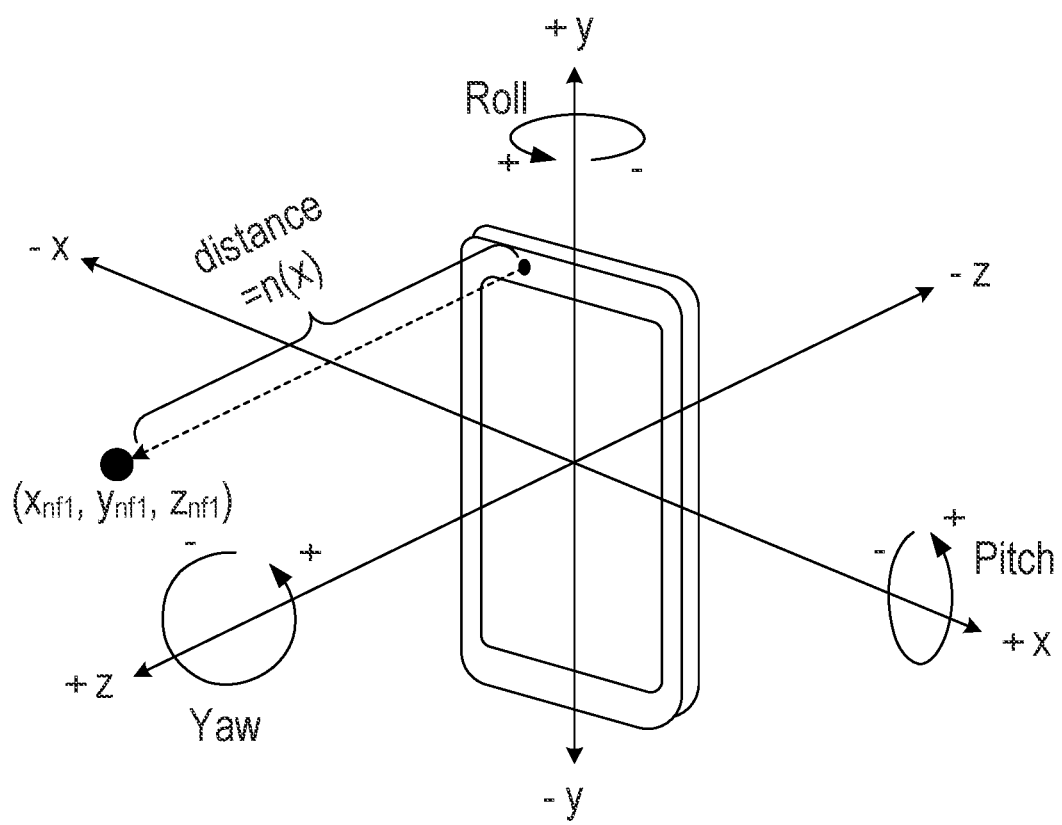
FIG. 5 illustrates the different types of data captured by the computing device of FIG. 1 during a first frame according to various embodiments of the present disclosure.

FIG. 5 illustrates the different types of data captured by the computing device 102 of FIG. 1 during a first frame. For a first frame of the live video, the computing device 102 obtains first position data comprising first positional coordinates of the computing device 102, first target positional coordinates of a first target point located a first predetermined distance from the computing device 102, first yaw data, first pitch data, and first roll data of the computing device 102. Similarly, for a second frame of the live video, the computing device 102 obtains second position data comprising second positional coordinates of the computing device 102, second target positional coordinates of a second target point located a second predetermined distance from the computing device 102, second yaw data, second pitch data, and second roll data of the computing device 102. The predetermined distance in which the first target point is located from the computing device 102 may comprise real number multiples of a distance (x) such that the predetermined distance is equal to n*(x), wherein n>1, x is a focal distance, and wherein a value of (n) is set based on an average distance between an object in a background and the computing device 102. The first position data captured by the computing device 102 is represented by $(x_{nf1}, y_{nf1}, z_{nf1})$.

Figure 6:
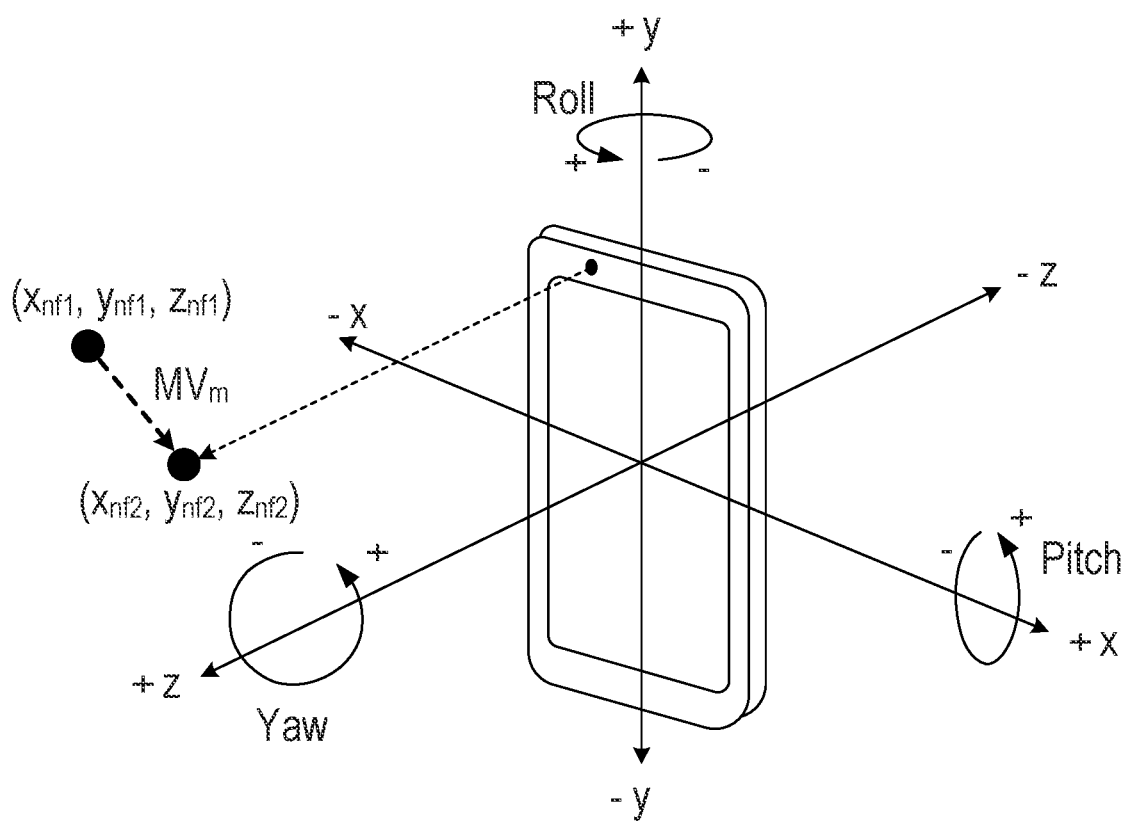
FIG. 6 illustrates the different types of data captured by the computing device of FIG. 1 during a second frame according to various embodiments of the present disclosure.

FIG. 6 illustrates the different types of data captured by the computing device 102 of FIG. 1 during a second frame. For a second frame of the live video, the computing device 102 similarly obtains second position data comprising second positional coordinates of the computing device 102, second target positional coordinates of a second target point located a second predetermined distance from the computing device 102, second yaw data, second pitch data, and second roll data of the computing device 102. Again, the predetermined distance in which the second target point is located from the computing device 102 may comprise real number multiples of a distance (x) such that the predetermined distance is equal to n*(x), wherein n>1, x is a focal distance, and wherein a value of (n) is set based on an average distance between an object in a background and the computing device 102. The second position data captured by the computing device 102 is represented by $(x_{nf2}, y_{nf2}, z_{nf2})$. The computing device 102 then calculates a target motion vector $(MV_m)$ based on the first position data and the second position data.

Figure 7:
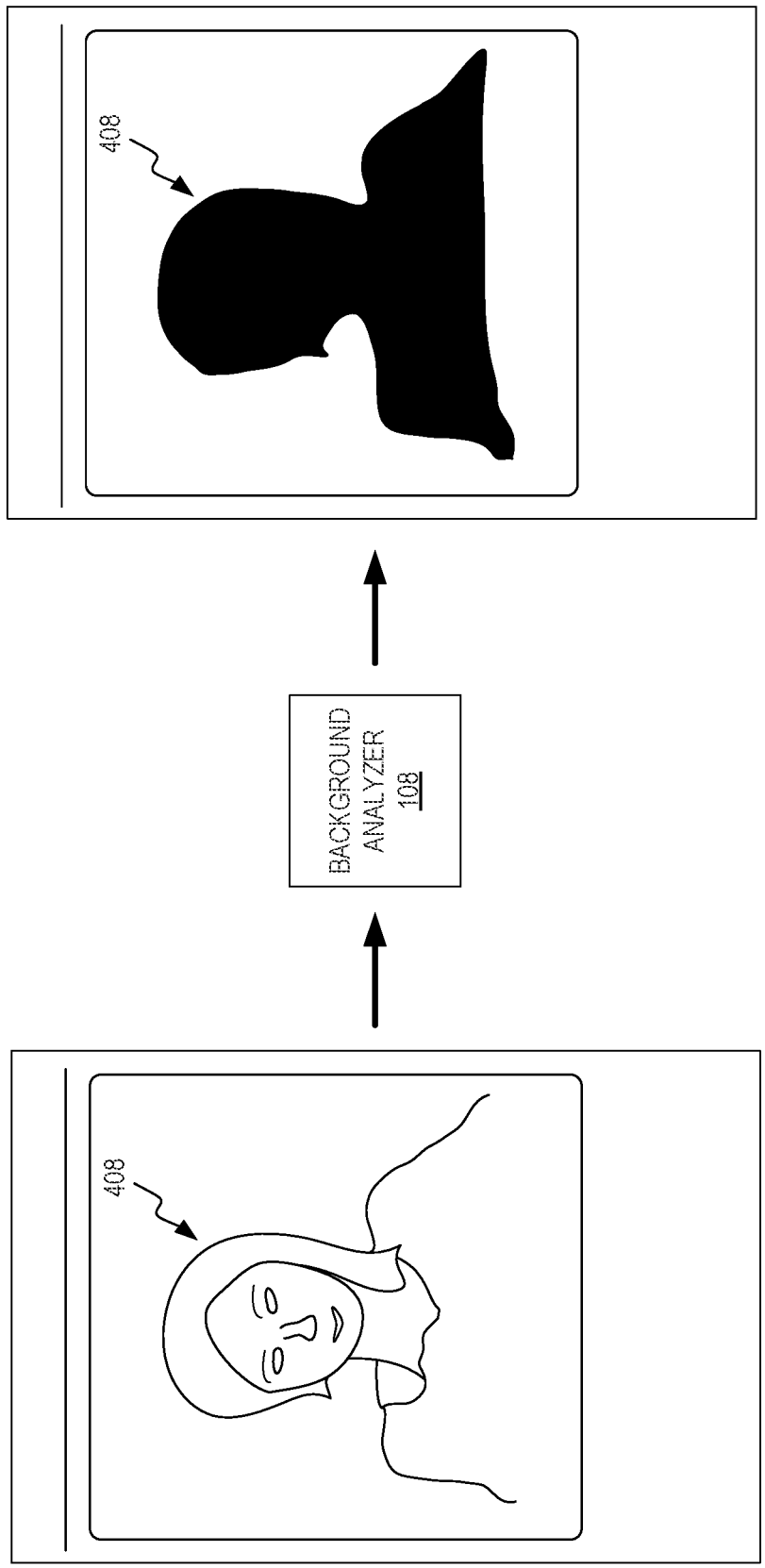
FIG. 7 illustrates the computing device in FIG. 1 performing facial detection and filtering all individuals depicted in multiple frames of the captured video to obtain background data according to various embodiments of the present disclosure.

FIG. 7 illustrates the computing device 102 in FIG. 1 performing facial detection and filtering all individuals depicted in frames of the captured video to obtain background data. The background analyzer 108 in the computing device 102 detects the facial region 408 of each individual and filters all individuals depicted in frames of the captured video to obtain first and second background data during the first and second frames, respectively.

Figure 8:
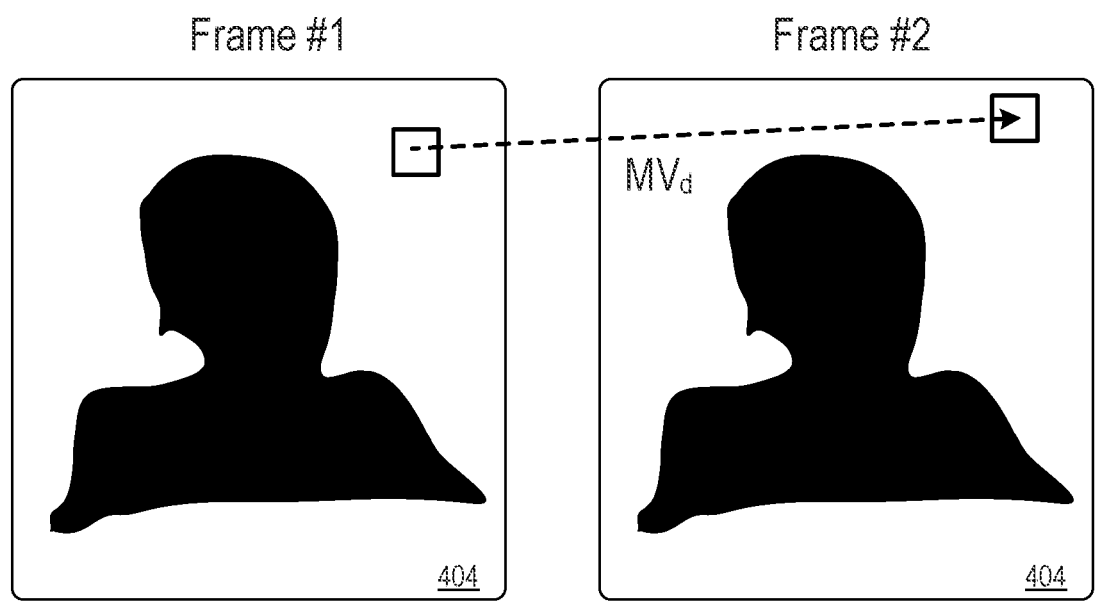
FIG. 8 illustrates calculation of a background motion vector by the computing device of FIG. 1 according to various embodiments of the present disclosure.

FIG. 8 illustrates calculation of a background motion vector by the computing device 102 of FIG. 1. The motion detector 106 (FIG. 1) in the computing device 102 calculates a background motion vector $(MV_d)$ based on feature points in each of the first background data and the second background data. The motion vector processor 110 (FIG. 1) determines a difference value between the target motion vector and the background motion vector, and the spoofing detector 112 (FIG. 1) determines that the user is spoofing the computing device 102 when the difference value exceeds a threshold value.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a computing device, comprising:
 capturing a live video of a user;
 for a first frame of the live video:

obtaining first target positional coordinates of a first target point located a first predetermined distance from the computing device; and obtaining first background data;

for a second frame of the live video:

obtaining second target positional coordinates of a second target point located a second predetermined distance from the computing device; and obtaining second background data;

calculating a target motion vector based on the first target point and the second target point, wherein calculating the target motion vector comprises:

obtaining first yaw data, first pitch data, and first roll data of the computing device, second yaw data, second pitch data, and second roll data of the computing device, first positional coordinates of the computing device, and second positional coordinates of the computing device;

performing three-dimensional (3D) coordinate transformation on the first target point based on the first yaw data, the first pitch data, and the first roll data of the computing device, the second yaw data, the second pitch data, the second roll data, the first positional coordinates of the computing device, and the second positional coordinates of the computing device to generate 3D coordinates of the first target point;

determining a difference value between the 3D coordinates of the first target point and 3D coordinates of the second target point to generate a 3D target motion vector; and transforming the 3D target motion vector into a two-dimensional (2D) target motion vector;

calculating a background motion vector based on feature points in the first background data of the first frame and the second background data in the second frame;

determining a difference value between the 2D target motion vector and the background motion vector; and determining whether the user is spoofing the computing device based on the difference value.

2. The method of claim 1, wherein obtaining the first background data and the second background data comprises performing facial detection and filtering all individuals depicted in the first frame and the second frame.

3. The method of claim 1, wherein the first and second positional coordinates of the computing device, first and second yaw data, first and second pitch data, and first and second roll data of the computing device are obtained based on acceleration measured by a gyroscope in the computing device and displacement measured by an accelerometer in the computing device.

4. The method of claim 1, wherein the first target positional coordinates of the first target point located and the second target positional coordinates of the second target point located from the computing device are calculated based on the first positional coordinates, the first yaw data, first pitch data, first roll data of the computing device, the second positional coordinates, the second yaw data, second pitch data, and second roll data of the computing device.

5. The method of claim 1, wherein the predetermined distances in which the first target point and the second target point are located from the computing device are real number multiples of a distance (x) such that the predetermined distance is equal to n*(x), wherein n>1, x is a focal distance, and wherein a value of (n) is set based on an average distance between an object in a background and the computing device.

6. The method of claim 5, wherein a determination is made that the user is spoofing the computing device when the difference value is greater than a threshold value.

7. A method implemented in a computing device, comprising:

capturing a live video of a user;

for a first frame of the live video:

obtaining first target positional coordinates of a first target point located a first predetermined distance from the computing device; and obtaining first background data;

for a second frame of the live video:

obtaining second target positional coordinates of a second target point located a second predetermined distance from the computing device; and obtaining second background data;

calculating a target motion vector based on the first target point and the second target point, wherein calculating the target motion vector comprises:

for the first frame of the live video:

obtaining the first target point in a first vertical plane located the first predetermined distance from the computing device, wherein the first target point is a real number multiple of a distance (x) such that the first predetermined distance is equal to n*(x), wherein n=1 and x is a focal distance; and modifying the first target point in the first vertical plane based on a first camera focus to determine a first point in the first vertical plane outside a facial region of the user;

for the second frame of the live video:

obtaining the second target point in a second vertical plane equal to the second predetermined distance n*(x) to obtain a focal point of the camera in the facial region of the user, wherein n=1; and modifying the second target point in the second vertical plane based on a second camera focus to determine a second point in the second vertical plane outside the facial region of the user; and determining a difference value between the second target point and the first target point to generate the target motion vector;

calculating a background motion vector based on feature points in the first background data of the first frame and the second background data in the second frame;

determining a difference value between the target motion vector and the background motion vector; and determining whether the user is spoofing the computing device based on the difference value.

8. The method of claim 7, wherein a determination is made that the user is spoofing the computing device when the difference value is less than a threshold value.

9. The method of claim 1, wherein determining the difference value between the target motion vector and the background motion vector comprises determining cosine similarity between the target motion vector and the background motion vector.

10. The method of claim 1, wherein calculating the background motion vector based on feature points in the first frame of first background data and the second frame of the second background data comprises:

selecting a plurality of feature points in the first background data and in the second background data meeting a threshold degree of similarity;

subtracting feature points in the second background data from corresponding feature points in the first background data to generate difference reference values; and averaging the reference values to generate the background motion vector.

11. A system, comprising:
a memory storing instructions;
a processor coupled to the memory and configured by the instructions to at least:
  capture a live video of a user;
  for a first frame of the live video:
    obtain first target positional coordinates of a first target point located a first predetermined distance from the system; and
    obtain first background data;
  for a second frame of the live video:
    obtain second target positional coordinates of a second target point located a second predetermined distance from the system; and
    obtain second background data;
  calculate a target motion vector based on the first target point and the second target point, wherein the processor is configured to calculate the target motion vector by:
    obtaining first yaw data, first pitch data, and first roll data of the system, second yaw data, second pitch data, and second roll data of the system, first positional coordinates of the system, and second positional coordinates of the system;
    performing three-dimensional (3D) coordinate transformation on the first target point based on the first yaw data, the first pitch data, and the first roll data of the system, the second yaw data, the second pitch data, the second roll data, the first positional coordinates of the system, and the second positional coordinates of the system to generate 3D coordinates of the first target point;
    determining a difference value between the 3D coordinates of the first target point and 3D coordinates of the second target point to generate a 3D target motion vector; and
    transforming the 3D target motion vector into a two-dimensional (2D) target motion vector;
  calculate a background motion vector based on feature points in the first background data of the first frame and the second background data in the second frame;
  determine a difference value between the 2D target motion vector and the background motion vector; and
  determine whether the user is spoofing the system based on the difference value.

12. The system of claim 11, wherein the predetermined distances in which the first target point and the second target point are located from the system are real number multiples of a distance (x) such that the predetermined distance is equal to n*(x), wherein n>1, and wherein a value of (n) is set based on an average distance between an object in a background and the system.

13. The system of claim 12, wherein the processor determines that the user is spoofing the system when the difference value is greater than a threshold value.

14. A system, comprising:
a memory storing instructions;
a processor coupled to the memory and configured by the instructions to at least:
  capture a live video of a user;
  for a first frame of the live video:
    obtain first target positional coordinates of a first target point located a first predetermined distance from the system; and
    obtain first background data;
  for a second frame of the live video:
    obtain second target positional coordinates of a second target point located a second predetermined distance from the system; and
    obtain second background data;
  calculate a target motion vector based on the first target point and the second target point, wherein the processor is configured to calculate the target motion vector by:
    for the first frame of the live video:
      obtaining the first target point in a first vertical plane located the first predetermined distance from the system, wherein the first target point is a real number multiple of a distance (x) such that the first predetermined distance is equal to n*(x), wherein n=1 and x is a focal distance; and
      modifying the first target point in the first vertical plane based on a first camera focus to determine a first point in the first vertical plane outside a facial region of the user;
    for the second frame of the live video:
      obtaining the second target point in a second vertical plane equal to the second predetermined distance n*(x) to obtain a focal point of the camera in the facial region of the user, wherein n=1; and
      modifying the second target point in the second vertical plane based on a second camera focus to determine a second point in the second vertical plane outside the facial region of the user; and
    determining a difference value between the second target point and the first target point to generate the target motion vector;
  calculate a background motion vector based on feature points in the first background data of the first frame and the second background data in the second frame;
  determine a difference value between the target motion vector and the background motion vector; and
  determine whether the user is spoofing the system based on the difference value.

15. The system of claim 14, wherein the processor determines that the user is spoofing the system when the difference value is less than a threshold value.

16. A non-transitory computer-readable storage medium storing instructions to be implemented by a computing device having a processor, wherein the instructions, when executed by the processor, cause the computing device to at least:
capture a live video of a user;
for a first frame of the live video:
  obtain first target positional coordinates of a first target point located a first predetermined distance from the computing device; and
  obtain first background data;
for a second frame of the live video:
  obtain second target positional coordinates of a second target point located a second predetermined distance from the computing device; and
  obtain second background data;

calculate a target motion vector based on the first target point and the second target point, wherein the processor calculates the target motion vector by:
  obtaining first yaw data, first pitch data, and first roll data of the computing device, second yaw data, second pitch data, and second roll data of the computing device, first positional coordinates of the computing device, and second positional coordinates of the computing device;
  performing three-dimensional (3D) coordinate transformation on the first yaw data, the first pitch data, and the first roll data of the computing device, the second yaw data, the second pitch data, the second roll data, the first positional coordinates of the computing device, and the second positional coordinates of the computing device to generate 3D coordinates of the first target point;
  determining a difference value between the 3D coordinates of the first target point and 3D coordinates of the second target point to generate a 3D target motion vector; and
  transforming the 3D target motion vector into a two-dimensional (2D) target motion vector;
calculate a background motion vector based on feature points in the first background data of the first frame and the second background data in the second frame;
determine a difference value between the 2D target motion vector and the background motion vector; and
determine whether the user is spoofing the computing device based on the difference value.

17. A non-transitory computer-readable storage medium storing instructions to be implemented by a computing device having a processor, wherein the instructions, when executed by the processor, cause the computing device to at least:
capture a live video of a user;
for a first frame of the live video:
  obtain first target positional coordinates of a first target point located a first predetermined distance from the computing device; and
  obtain first background data;
for a second frame of the live video:
  obtain second target positional coordinates of a second target point located a second predetermined distance from the computing device; and
  obtain second background data;
calculate a target motion vector based on the first target point and the second target point, wherein the processor calculates the target motion vector by:
  for the first frame of the live video:
    obtaining the first target point in a first vertical plane located the first predetermined distance from the computing device, wherein the first target point is a real number multiple of a distance (x) such that the first predetermined distance is equal to n*(x), wherein n=1 and x is a focal distance; and
    modifying the first target point in the first vertical plane based on a first camera focus to determine a first point in the first vertical plane outside a facial region of the user;
  for the second frame of the live video:
    obtaining the second target point in a second vertical plane equal to the second predetermined distance n*(x) to obtain a focal point of the camera in the facial region of the user, wherein n=1; and
    modifying the second target point in the second vertical plane based on a second camera focus to determine a second point in the second vertical plane outside the facial region of the user; and
  determining a difference value between the second target point and the first target point to generate the target motion vector;
calculate a background motion vector based on feature points in the first background data of the first frame and the second background data in the second frame;
determine a difference value between the target motion vector and the background motion vector; and
determine whether the user is spoofing the computing device based on the difference value.

\* \* \* \* \*